(12) United States Patent
Ichikawa et al.

(10) Patent No.: US 8,531,059 B2
(45) Date of Patent: Sep. 10, 2013

(54) WIRELESS POWER TRANSFER SYSTEM AND A LOAD APPARATUS IN THE SAME WIRELESS POWER TRANSFER SYSTEM

(75) Inventors: Katsuei Ichikawa, Yokohama (JP); Taku Takaki, Fujisawa (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 355 days.

(21) Appl. No.: 12/619,019

(22) Filed: Nov. 16, 2009

(65) Prior Publication Data
US 2010/0164295 A1 Jul. 1, 2010

(30) Foreign Application Priority Data
Dec. 26, 2008 (JP) ................................. 2008-331861

(51) Int. Cl.
*H01F 37/00* (2006.01)
(52) U.S. Cl.
USPC ............ 307/104; 307/149; 307/151; 320/108
(58) Field of Classification Search
USPC ............................ 307/104, 149, 151; 320/108
See application file for complete search history.

(56) References Cited

U.S. PATENT DOCUMENTS

| | | | |
|---|---|---|---|
| 6,370,044 B1* | 4/2002 | Zhang et al. | 363/21.06 |
| 2007/0247005 A1* | 10/2007 | Tetlow | 307/104 |
| 2008/0197711 A1* | 8/2008 | Kato et al. | 307/104 |
| 2008/0266748 A1* | 10/2008 | Lee | 361/270 |
| 2009/0015075 A1* | 1/2009 | Cook et al. | 307/149 |
| 2009/0058189 A1* | 3/2009 | Cook et al. | 307/104 |
| 2010/0213770 A1* | 8/2010 | Kikuchi | 307/104 |
| 2011/0231029 A1* | 9/2011 | Ichikawa et al. | 700/298 |

FOREIGN PATENT DOCUMENTS
JP 11-188113 7/1999

OTHER PUBLICATIONS

André Kurs et al.; Wireless Power Transfer via Strongly Coupled Magnetic Resonances; Science AAAS; Jul. 6, 2007; pp. 83-85, Science vol. 317.

* cited by examiner

*Primary Examiner* — Jared Fureman
*Assistant Examiner* — Alfonso Perez Borroto
(74) *Attorney, Agent, or Firm* — Antonelli, Terry, Stout & Kraus, LLP.

(57) ABSTRACT

In wireless power transfer with applying magnetic resonance therein, for suppressing deterioration of transfer efficiency, with lessening fluctuation of the resonance frequency when a distance between coils is close to, coils are so position that a supply-side power supply coil 101 and a load-side power supply coil 102 are inserted between a supply-side magnetic resonance coil 1 and a load-side magnetic resonance coil 2.

11 Claims, 9 Drawing Sheets

WIRELESS POWER TRANSFER SYSTEM AND A LOAD APPARATUS IN THE SAME WIRELESS POWER TRANSFER SYSTEM

BACKGROUND OF THE INVENTION

The present invention relates to a wireless power transfer system and a load apparatus in the same wireless power transfer system. For example, in particular, it relates to a wireless power transfer means and apparatus with applying a magnetic resonance phenomenon, and relates to a technology, being effectively applicable to an apparatus for charging a wireless IC card and/or portable or mobile equipment mounting a battery, in a wireless manner.

For example, Japanese Patent Laying-Open No. Hei 11-188113 (1999) is already known. In this patent document is described "[Problem (s)] Enabling stable power transmission, without breaking the resonance condition of coils even of the distance between transmission coils is fluctuated. [Resolving Means] It comprises a transmitter coil 21 and a receiver coil 11, which are disposed to face each other, with putting a skin between them, a capacitance variable capacitor 22 connected to the transmitter coil 21, so as to build up a resonance circuit, a capacitance variable capacitor 12 connected to the receiver coil, so as to build up a resonance circuit, voltage detector circuits 23 and 13, each for detecting a voltage level of the transmitter coil 21 or the receiver coil 22, respectively, a capacitance control circuit 24, inputting the voltage level detected by the voltage detector circuit 23, for changing the capacitance of the capacitance variable capacitor so that the said voltage level detected can always keep the maximum value, and a capacitance control circuit 14, inputting the voltage level detected by the voltage detector circuit 13, for changing the capacitance of the capacitance variable capacitor so that the said voltage level detected can always keep the maximum value."

Also, for example, Andre Kurs, et al. "Wireless Power Transfer via Strongly Coupled Magnetic Resonances" SCIENCE, VOL 317, pp 83-85, 6 Jul. 2007 is already known. In this document is described "Using self-resonant coils in a strongly coupled regime, we experimentally demonstrated efficient nonradiative power transfer over distances up to 8 times the radius of the coils. We were able to transfer 60 watts with ~40% efficiency over distances in excess of 2 meters. We present a quantitative model describing the power transfer, which matches the experimental results to within 5%. We discuss the practical applicability of this system and suggest directions for further study."

[Patent Document] Japanese Patent Laying-Open No. Hei 11-188113 (1999); and
[Non-Patent Document] Andre Kurs, et al. "Wireless Power Transfer via Strongly Coupled Magnetic Resonances" SCIENCE, VOL 317, pp 83-85, 6 Jul. 2007.

BRIEF SUMMARY OF THE INVENTION

As the technology, in relation to the technology of the wireless power transfer means, on which the present inventors study, for example, the structures as shown in FIG. 8 can be considered, as an example thereof.

A wireless power transfer means shown in FIG. 8, applying the magnetic resonance phenomenon of electromagnetic induction therein, comprises a supply-side magnetic resonance coil 1, a load-side magnetic resonance coil 2, a supply-side power supply coil 3, a load-side power supply coil 4, an oscillator 5 and a lamp 6, as a load, wherein the supply-side power supply coil 3 is provided at distance "ks" in the vicinity of the supply-side magnetic resonance coil 1, thereby coupling with the supply-side magnetic resonance coil 1 through the electromagnetic induction. In this instance, since the supply-side magnetic resonance coil 1 is excited or oscillated with high efficiency when supplying a transmission power from the oscillator 5 to the supply-side power supply coil 3 with the frequency equal to the resonance frequency, which is mainly determined by the diameter and a number of turns of the supply-side magnetic resonance coil 1, then a large amount of current flows in the supply-side magnetic resonance coil 1 with the resonance frequency, and thereby generating a strong magnetic field. Herein, since the load-side magnetic resonance coil 2, having the resonance frequency same to that of the supply-side magnetic resonance coil 1, strongly couples with the supply-side magnetic resonance coil 1 (i.e., the magnetic resonance phenomenon), a large amount of current flows also in the load-side magnetic resonance coil 2, and an electromotive force is generated in the load-side power supply coil 4, which is provided at the distance "ks" in the vicinity thereof. This phenomenon is called the wireless power transfer with using magnetic resonance, in general.

As an example of the wireless power transfer, contents of an experiment described in the Non-Patent document 1 will be shown hereinafter.

The structures of the experiment of the Non-Patent document 1 are similar to those of the example of the technology shown in FIG. 8, wherein the diameter of the supply-side magnetic resonance coil 1 and the load-side magnetic resonance coil 2 is 60 cm, and the number of turns thereof is 5.25 turns, and the magnetic resonance frequency at this instance is 10 MHz. Also, the diameter of the supply-side power supply coil 3 and the load-side power supply coil 4 is 50 cm, each of the distances "ks" and "kD" between the power supply coils and magnetic resonance coils is 10 cm, and there can be obtained the following experimental results, i.e., 90% or more of the transfer efficiency when determining the distance "k" between the supply-side magnetic resonance coil 1 and the load-side magnetic resonance coil 2 to be 100 cm, and about 45% of the transfer efficiency when determining to be 200 cm. In case of applying a general electromagnetic induction therein, the efficiency is around 50% to 75% when the transmission distance is around from a several mm to a several cm, and since the transfer efficiency is greatly deteriorated or reduced when extending the transmission distance longer than this, it can be said that the power transfer applying the magnetic resonance phenomenon is superior, in an aspect of the transmission distance or the transfer efficiency thereof.

Also, as the technology, in relation to the technology of the wireless power transfer means, on which the present inventors study, for example, the structures as shown in FIG. 9 can be considered, as an example thereof.

The wireless power transfer means shown in FIG. 9 applying the electromagnetic induction therein, comprises a supply-side electromagnetic induction coil 10, a load-side electromagnetic induction coil 11, capacitance variable capacitors 12 and 13, a smoothing capacitor 14, a rectifier circuit 15, a driver 16, a load circuit 17, voltage detector circuits 18 and 19, and capacitance controller circuits 20 and 21, wherein the rectifier circuit 15 is built up with a bridge circuit made up with rectifier diodes 31, 32, 33 and 34.

In the same figure, a large amount of current flows in the supply-side electromagnetic induction coil 10 when being the resonance frequency, which is determined by an inductance of the supply-side electromagnetic induction coil 10 connected to the driver circuit 16, and the capacitance value of the capacitance variable capacitor 12, which is connected in parallel with that inductor, and generates a strong magnetic field.

Also, the load-side electromagnetic induction coil 11 is connected with the rectifier circuit 15, and also with the capacitance variable capacitor 13 in parallel therewith, and since electromagnetically induced voltage generated between both ends of the load-side electromagnetic induction coil 11 goes up to the maximum, in case when the frequency of the magnetic field generated by the supply-side electromagnetic induction coil 10 is equal to the resonance frequency, which is determined by the inductance of the load-side electromagnetic induction coil 11 and the capacitance value of the capacitance variable capacitor 13 connected in parallel therewith, and therefore the transfer efficiency goes up to the maximum. Also, the transmission power, which is outputted between both terminals of the load-side electromagnetic induction coil 11 by the rectifier circuit 15 and the smoothing capacitor 14 is converted into direct current, so as to supply electric power into the load circuit 17.

In this instance, in order for the voltage generated between the both ends of the supply-side electromagnetic induction coil 10 to increase to the highest, responding to the voltage of the coil, which is detected by the voltage detector circuit 18, the capacitance value of the capacitance variable capacitor 12 is adjusted by the capacity controller circuit 20, and thereby it is possible to bring the frequency of power transfer wave supplied from the driver circuit 16 to be coincident with the resonance frequency of the transmitter-side coil.

In the similar manner, adjusting the capacitance value of the capacitance variable capacitor 13 by the voltage detector circuit 19 and the capacitance controller circuit 21, the voltage across the both terminals can increase up to the highest, in the load-side electromagnetic induction coil 11, and therefore it is possible to achieve an improvement of the transfer efficiency.

By the way, the wireless power transfer means, according to the technology shown in FIG. 8 in the above, applies the magnetic resonance phenomenon of electromagnetic induction, and the technology shown in FIG. 9 mentioned above applies the electromagnetic induction therein. In case when comparing them with each other, the magnetic resonance phenomenon is same to the electromagnetic induction in an aspect that the power transfer can be made with high efficiency when the resonance frequency of the supply-side magnetic resonance coil is coincident with the resonance frequency of the load-side magnetic resonance coil. However, band of the resonance frequency when the power transfer is made by applying the magnetic resonance phenomenon is narrow, comparing to that when applying the electromagnetic induction; i.e., it is impossible to transfer the electric power even if the value of the resonance frequency is shifted a little bit.

For this reason, there is necessity of brining the resonance frequencies on the supply side and the load side to be coincident, correctly, but in FIG. 8, if connecting the capacitance variable capacitor in parallel with the supply side magnetic resonance coil and the load side magnetic resonance coil as shown FIG. 9, it has a drawback that the "Q" value of the magnetic resonance capacitor goes down due to the resistance loss of the high-frequency waves in the capacitance variable capacitor, etc., and thereby brining about a lowering of the transfer efficiency.

Further, with the power transfer with applying the magnetic resonance phenomenon, since strong magnetic field is generated by increasing the "Q" value of the coil as high as possible, with connecting nothing with the magnetic resonance coil, and by enlarging the current flowing through the coil as large as possible, therefore on the other hand that a long transfer distance and a high transfer efficiency can be obtained, comparing to the electromagnetic induction method, it has a drawback that the band of the resonance frequency of the magnetic resonance coils on the supply side and the load side is narrow, and that it is difficult to bring the resonance frequencies on the supply side and on the load side to be coincident with each other.

Also, with the power transfer method applying the magnetic resonance phenomenon therein, in case when brining the supply-side magnetic resonance coil and the load-side magnetic resonance coil close to each other, up to the distance from several "mm" to several "cm", under which relatively high transfer efficiency can be obtained with the electromagnetic induction method, since mutual coupling between the coils becomes too strong, there is generated a phenomenon of preventing the magnetic resonance phenomenon.

Next, details about this phenomenon will be mentioned. If assuming that the magnetic resonance frequency is "f" when the coils are separated by a certain degree of distance, the frequency of the magnetic resonance comes to have the resonance frequencies at two (2) points, $f-\Delta f$ and $f+\Delta f$, if brining the distance between the magnetic resonance coils up to from several "mm" to several "cm". Further, the value of this $\Delta f$ has a tendency of becoming large as the distance comes to be near.

For this reason, when conducting transfer of the power while keeping the magnetic resonance frequency to be constant, it has a drawback that the transfer efficiency is deteriorated, contrarily, if shortening the distance between the magnetic resonance coils.

Further, with the technology shown in FIG. 9, though the electric power transferred is converted into DC voltage by means of a rectifier circuit, which is constructed with diodes, but the voltage drop in the diode forward direction is about 0.7 V, and due to the power loss generated by this voltage drop, it has a problem that the transfer efficiency is lowered down, of the wireless power transfer system, as a whole.

According to the present invention, for the purpose of dissolving or improving the problem mentioned above is applied the structures, which are described in the pending claims. For example, with the problems that the "Q" value is lowered down if adding the capacitance variable capacitor in order to adjust the resonance frequency, i.e., the problem mentioned above, and thereby lowering the transfer efficiency, and that the transfer efficiency is deteriorated, to the contrary thereof, if the distance between the coils comes to close to each other; in the technology shown in FIG. 8, coils are so disposed that a distance between a supply-side magnetic resonance coil and a load-side power supply coil is shorter than a distance between a supply-side magnetic resonance coil and a load-side magnetic resonance coil.

With applying such structures therein, since the supply-side power supply coil and the load-side power supply coil are inserted between the supply-side magnetic resonance coil and the load-side magnetic resonance coil, in the structures thereof, a magnetic field, being generated due to current flowing through the supply-side power supply coil and the load-side power supply coil, functions in a direction of preventing the magnetic resonance coils from being strongly coupled with. With this function, the coupling between the magnetic resonance coils will not be a strong one even if the distance between the magnetic resonance coils comes to be short. For this reason, it is possible to suppress the phenomenon that the magnetic resonance frequency shift largely depending on the distance between the coils, or that two (2) magnetic resonance frequencies appear.

With the above-mentioned, since there is no necessity of the capacitance variable capacitor for enabling to change the resonance frequency, and the "Q" value of the magnetic resonance coils can be increased to be high, then it is possible to keep the high transfer efficiency. Further, since the coupling between the magnetic resonance coils will not come to be strong one, therefore it is possible to suppress the deterioration of transfer efficiency when the distance between the coils comes close to.

Also, for example, with the problem that it is difficult to bring the resonance frequencies to be coincident with, between the supply-side and the load-side, a first load-side power supply coil and a second load-side power supply coil are provided, wherein said coils are so disposed that a distance between said supply-side magnetic resonance coil and said first load-side power supply coil is shorter than the distance between said supply-side magnetic resonance coil and said load-side magnetic resonance coil, and is a distance between said supply-side magnetic resonance coil and said second load-side power supply coil is longer than that, and further provided a power synthesizer circuit, which is configured to take out an electric power by composing the transferred electric powers to be outputted to said first load-side power supply coil and said second load-side power supply coil, in the structures thereof. Or, there is further provided an exchanger circuit, which is configured to detect the transferring voltages outputted to said first load-side power supply coil and said second load-side power supply coil, thereby taking an electric power from the power supply coil having higher voltage, in the structures thereof.

With such the structures mentioned above, the transferring power can be taken out from the first load-side power supply coil when the distance between the coils is close to so that the coupling condition is strong, while the transferring power can be taken out from the second load-side power supply coil when there is a certain degree of the distance between the coils; therefore, it is possible to widen the band of the resonance frequency on the load-side, equivalently. With this, it is possible to lessen the deterioration of the transfer efficiency due to the distance between the coils.

Also, for example, with the problem that the electric power loss is large when converting into the DC voltage due to applying the diodes in the rectifier circuit, a rectifier circuit is applied therein, which is configured to convert a transferring power having a frequency equal to a magnetic resonance frequency, which is outputted from said load-side power supply coil, into a DC power, and said rectifier circuit is a synchronization rectifier circuit, which is built up with MOS transistors, in the structures. Further, within the rectifier circuit applying the MOS transistors therein, since there is necessity of turning ON/OFF the gates of the MOS transistors in synchronism with the frequency of the transferring power inputted into the rectifier circuit, then this synchronization signal is taken out from the load-side power supply coil, with providing a tap on that load-side power supply coil.

With such structures mentioned above, comparing to the forward-direction voltage drop of the diode is about 0.7 V, in the rectifier circuit applying the diodes therein, since the voltage drop of the MOS transistor is around 0.1 V when it is turned ON, then it is possible to reduce the electric power loss in the rectifier circuit to be small, and therefore there can be obtain the wireless power transfer apparatus having high transfer efficiency.

According to the present invention, the problems mentioned above can be dissolved or improved. For example, it is possible to suppress the deterioration of the transfer efficiency due to fluctuation of the resonance frequency when the distance between the coils is close to, and also it is possible to obtain the wireless power transfer means with less lowering of the transfer efficiency even when the coils are separated at a certain degree of distance. Further, no means for varying the frequency is applied therein, it can be achieved with a simple structure.

Further, it is possible to obtain the wireless power transfer apparatus having high transfer efficiency, for example, by applying the rectifier circuit, less in the conversion loss when converting the transferring power into DC.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Figure 1:
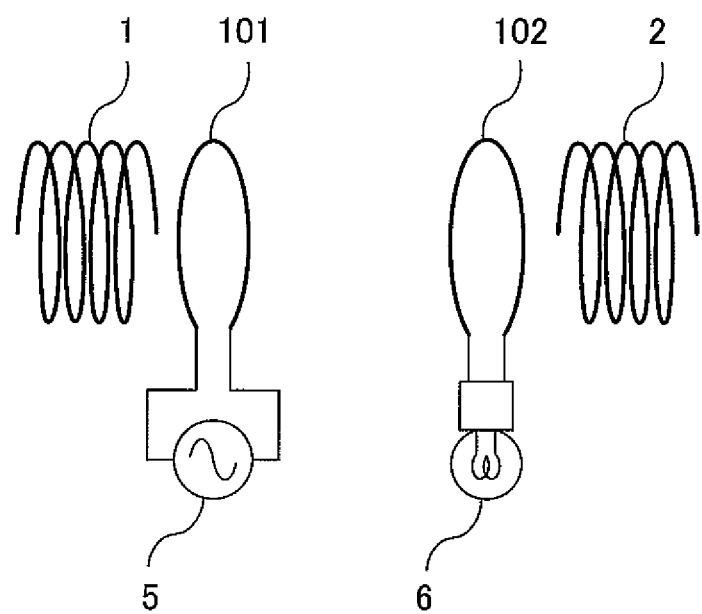
FIG. 1 is a view for showing the structures of a wireless power transfer means, according to a first embodiment of the preset invention.

Hereinafter, embodiments according to the present invention will be fully explained by referring to the drawings attached herewith.

Explanation will be made on a first embodiment of the wireless power transfer apparatus according to the present invention.

FIG. 1 is a view for showing the first embodiment of the wireless power transfer means applying the magnetic resonance phenomenon, to be applied in the present invention.

Figure 8:
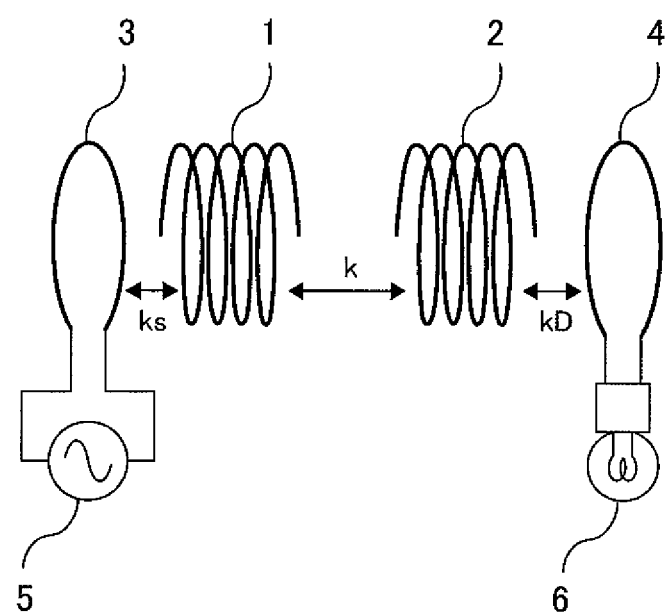
FIG. 8 is the structural view for showing an example of the wireless power transfer, applying the magnetic resonance phenomenon therein.
Figure 9:
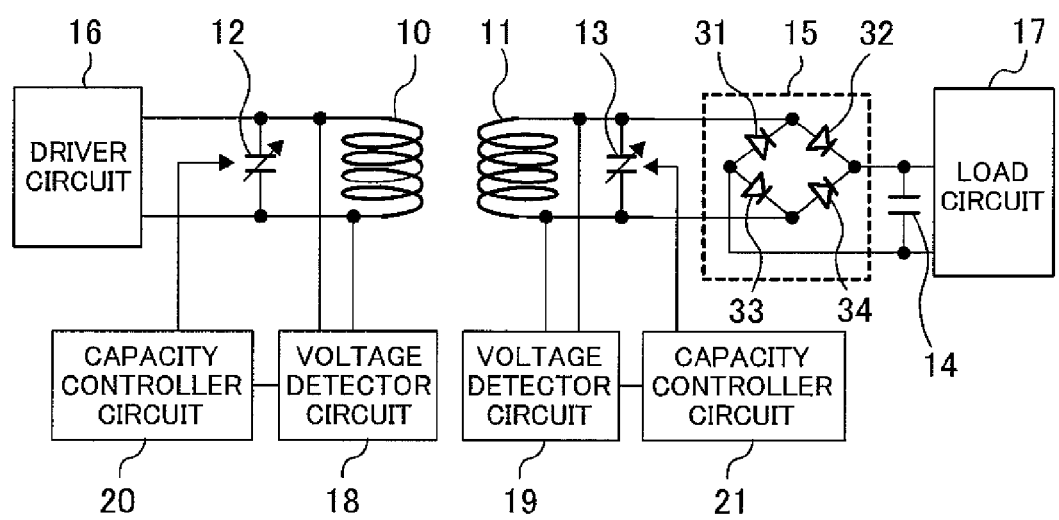
FIG. 9 is a block diagram for showing an example of the wireless power transfer, applying electromagnetic induction therein.

In the figure, a reference numeral 1 depicts a supply-side magnetic resonance coil, 2 a load-side magnetic resonance coil, 101 a supply-side power supply coil, 102 a load-side power supply coil, 5 an oscillator, 6 a lamp as a load, respectively, and comparing to the example of the conventional art shown in FIG. 8, the supply-side power supply coil 101 is so position that the coil distance between the supply-side power supply coil 101 and the load-side magnetic resonance coil 2 comes to be shorter than that between the supply-side magnetic resonance coil 1 and the load-side magnetic resonance coil 2. Further, the load-side power supply coil 102 is so positioned that the coil distance between the supply-side magnetic resonance coil 1 and the load-side power supply coil 102 comes to be shorter than that between the supply-side magnetic resonance coil 1 and the load-side magnetic resonance coil 2.

With such the structures as mentioned above, the supply-side power supply coil 101 and the load-side power supply coil 102 are inserted between the coils, i.e., the supply-side magnetic resonance coil 1 and the load-side magnetic resonance coil 2 in the structures, and therefore, in case where the transfer distance between the supply-side magnetic resonance coil 1 and the load-side magnetic resonance coil 2 is short, a coupling of those coils is suppressed from comes into a strong coupling by the magnetic field, which is generated by the supply-side power supply coil 101 and the load-side power supply coil 102, and therefore it is possible to obtain a wireless power transfer means, for enabling to suppress a lowering of the transfer efficiency even in case where the transfer distance is near.

Figure 2:
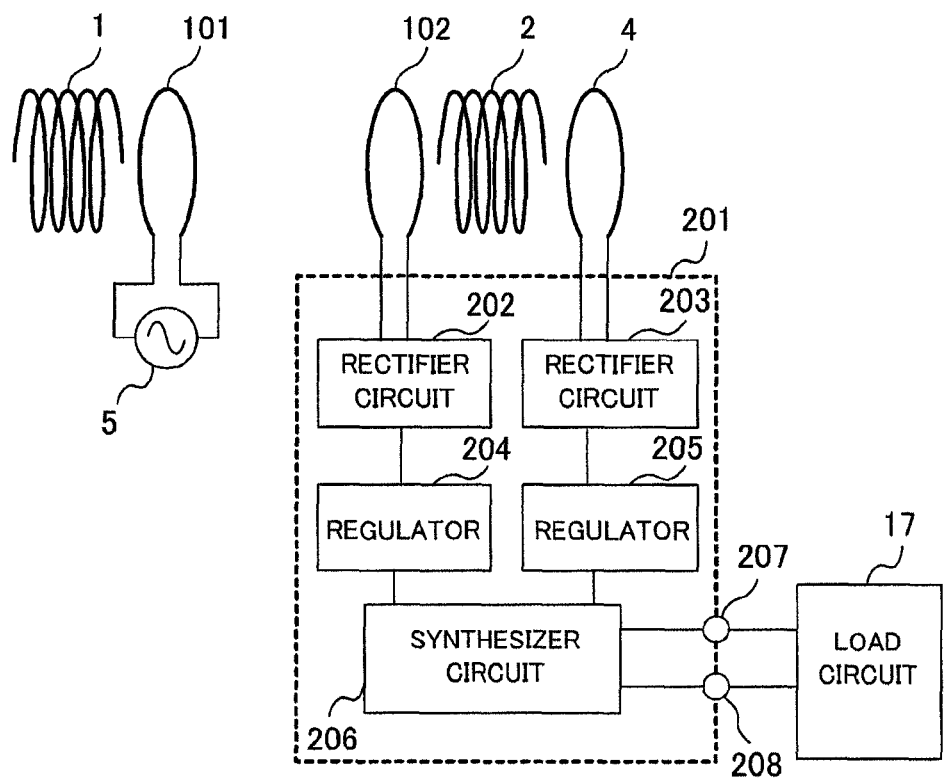
FIG. 2 is a block diagram for showing the structures of a wireless power transfer means, according to a second embodiment of the preset invention.

Next, FIG. 2 is a view for showing a second embodiment of the wireless power transfer means applying the magnetic resonance phenomenon, to be applied in the present invention.

In the figure, a reference numeral 201 depicts a power synthesizer circuit, 17 a load circuit, 207 and 208 transferring electric power output terminals, wherein the power synthesizer circuit 201 is built up with rectifier circuits 202 and 203, regulators 204 and 205, and a synthesizer circuit 206, and the others corresponding to those shown in FIG. 1 are attached with the same reference numerals and the explanation thereof will be omitted herein.

In the figure, the load-side power supply coil 102 is so positioned that the coil distance between the supply-side magnetic resonance coil 1 and the load-side power supply coil 102 comes to be shorter than that between the supply-side magnetic resonance coil 1 and the load-side magnetic resonance coil 2, and as well as, a load-side power supply coil 4 is so positioned that the coil distance between the supply-side magnetic resonance coil 1 and the load-side magnetic resonance coil 2 comes to be longer than that, in the structures thereof, and those power supply coils are connected to the power synthesizer circuit 201.

Further, the load-side power supply coils 102 and 4 are connected to the switching regulators 204 and 205 through the rectifier circuits 202 and 203, respectively, and outputs of those regulators are connected to the synthesizer circuit 206, and also to the load circuit 17.

Within the wireless power transfer means mentioned above, the transferring electric powers outputted to the load-side power supply coils 102 and 4, after being converted into DC powers from high-frequency power, respectively, by means of the rectifier circuits 202 and 203, are inputted into the switching regulators 204 and 205. The transferring electric powers inputted are converted into DC voltages, respectively, each being equal to in the value, by means of the switching regulators 204 and 205, to be outputted, and are composed by the synthesizer circuit 206, and thereby electric powers are supplied to the load circuit 17 through the transferring electric power output terminals 207 and 208.

With the embodiment mentioned above, in addition to obtaining the similar effects in the first embodiment, since the load-side power supply coils 102 and 4 are provided at different distances from the supply-side magnetic resonance coil 1, so that the transferring electric powers can be composed to be supplied into the load circuit 17, then the band of the resonance frequency on the load side can be widen, equivalently. With this, it is possible to obtain the wireless power transfer means having less deterioration of the transfer efficiency due the distance between the coils.

Figure 3:
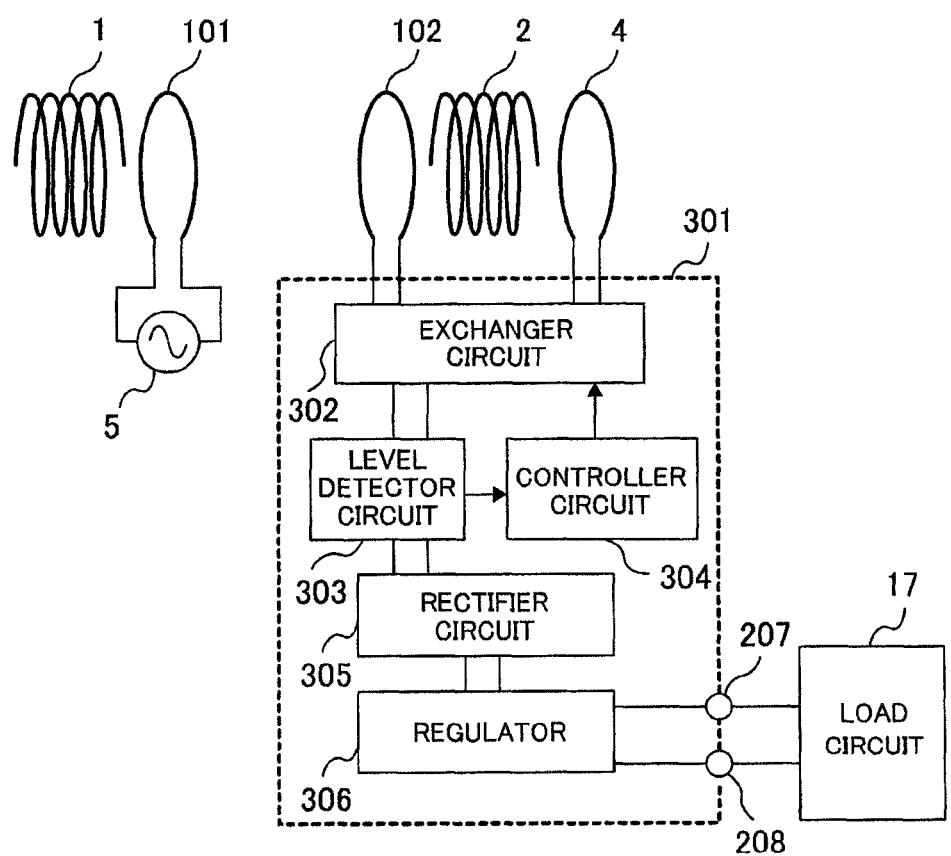
FIG. 3 is a block diagram for showing the structures of a wireless power transfer means, according to a third embodiment of the preset invention.

Next, FIG. 3 is a view for showing a third embodiment of the wireless power transfer means applying the magnetic resonance phenomenon, to be applied in the present invention.

In the figure, a reference numeral 301 depicts a coil exchanger circuit, being built up with an exchanger circuit 302, a level detector circuit 303, a controller circuit 304, a rectifier circuit 305 and a regulator 306, and the other portions corresponding to those shown in FIG. 2 are attached with the same reference numerals, and therefore explanation thereof will be omitted herein.

In the figure, the load-side power supply coils 102 and 4 are connected with the exchanger circuit 302, and an output of the exchanger circuit 302 is connected through the level detector circuit 303 and the rectifier circuit 305 to the switching regulator 306, and is also connected to the load circuit 17, Within the wireless power transfer means mentioned above, the voltage of the transferring electric powers, which are outputted to the load-side power supply coils 102 and 4, are compared with, in the exchanger circuit 302 and the level detector circuit 303, and in the controller circuit 304, exchange is made on the coil having higher voltage. And, the transferring electric power outputted from the voltage value is converted into DC voltage by means of the rectifier circuit 305, being converted into a desired voltage value by means of the switching regulator 306, and is supplied into the load circuit 17 through the transferring electric power output terminals 207 and 208.

With embodiment mentioned above, in addition to obtaining the similar effects s in the second embodiment, there can be obtained a wireless power transfer means having less deterioration of the transfer efficiency with easy constructions, since the rectifier circuit and the regulator are enough by only one (1) set thereof, respectively.

Figure 4:
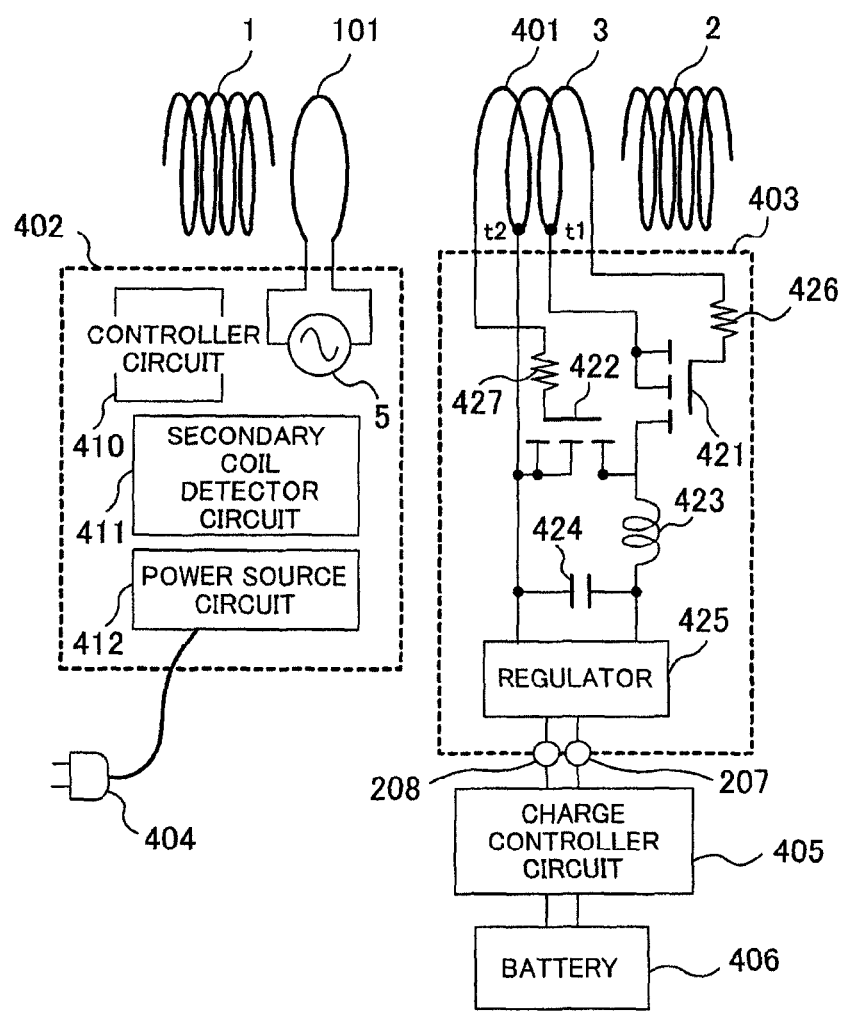
FIG. 4 is a block diagram for showing the structures of the wireless power transfer means, according to the first embodiment of the preset invention.

Next, FIG. 4 is a view for showing the first embodiment of the wireless power transfer apparatus, applying the magnetic resonance phenomenon therein, to be applied in the present invention.

In the figure, a reference numeral 401 depicts a load-side power supply coil, 402 a transmitter portion power circuit, 403 is a power rectifier circuit, 404 a plug or socket, 405 a charge controller circuit, and 406 a battery, respectively, wherein the transmitter portion power circuit 402 is constructed with the oscillator circuit 5, a controller circuit 410, a secondary-side coil detector circuit 411, and a power circuit 412, and also the power rectifier circuit 403 is constructed with rectifying MOS transistors 421 and 422, an inductor 423, a capacitor 424, a witching regulator 425, and resistors 426 and 427, but the other portion corresponding to those shown in FIG. 2 are attached with the same reference numerals, and therefore the explanation thereof will be omitted herein.

In the figure, the load-side power supply coil 401 has a turn number at least 3 turns or more, being provided with two (2) intermittent taps t1 and t2, wherein the tap t1 is connected to a source of the MOS transistor 421 of the power rectifier circuit 403, while a gate thereof is connected to a coil end on the side of the tap t1 through the resistor 426, and a drain thereof is connected to the switching regulator 425 through the inductor 423. Also, the source of the MOS transistor 422 is connected to the tap t2, as well as, to the switching regulator 425, and is connected to a coil end on the side of the tap t2 through the resistor 427, and also the drain thereof is connected to a junction between the drain of the MOS transistor 421 and the inductance 423. Further, between the inputs of the switching regulator is added the capacitor 424, and also the output power from the switching regulator 425 is outputted to the charge controller circuit 405 through the transferring electric power output terminals 207 and 208.

The transmitter portion power circuit 402 converts the voltage of AC 100V from the plug 404 into DC voltage by means of the electric power circuit 412, thereby to supply necessary electric power to the transmitter portion. Also, the secondary-side coil detector circuit 411 detects on whether the load-side electromagnetic resonance coil is disposed in the vicinity of the transmitter side, and if the load-side coil is located near, then the oscillator 5 is turned ON by the controller circuit 410, and thereby staring the power transfer. Also, if the load-side electromagnetic resonance coil is removed during the power transfer, then the controller circuit 410, the secondary-side coil detector circuit 411 of which is detecting that, turns the oscillator 5 into OFF condition, and thereby preventing from unnecessary irradiation of the electric power.

As was mentioned above, the transferring electric power of high-frequency, which is outputted from the oscillator 5, is outputted from the load-side power supply coil 401 through the supply-side magnetic resonance coil 1 and the load-side magnetic resonance coil 2, and it is converted into DC voltage by the power rectifier circuit 403; therefore, it is possible to charge into the battery 604 by supplying the electric power to the charge controller circuit 405.

With such construction mentioned above, by using a synchronization rectifier circuit of MOS transistors as the rectifier circuit, the power loss within the rectifier circuit can be lessened, comparing to the conventional rectifier circuit applying the diodes therein, and therefore it is possible to obtain the wireless power transfer apparatus having high transfer efficiency.

Next, explanation will be made on an effect according to the embodiment (s) of the present invention, by referring to FIGS. 5, 6 and 7.

Figure 5:
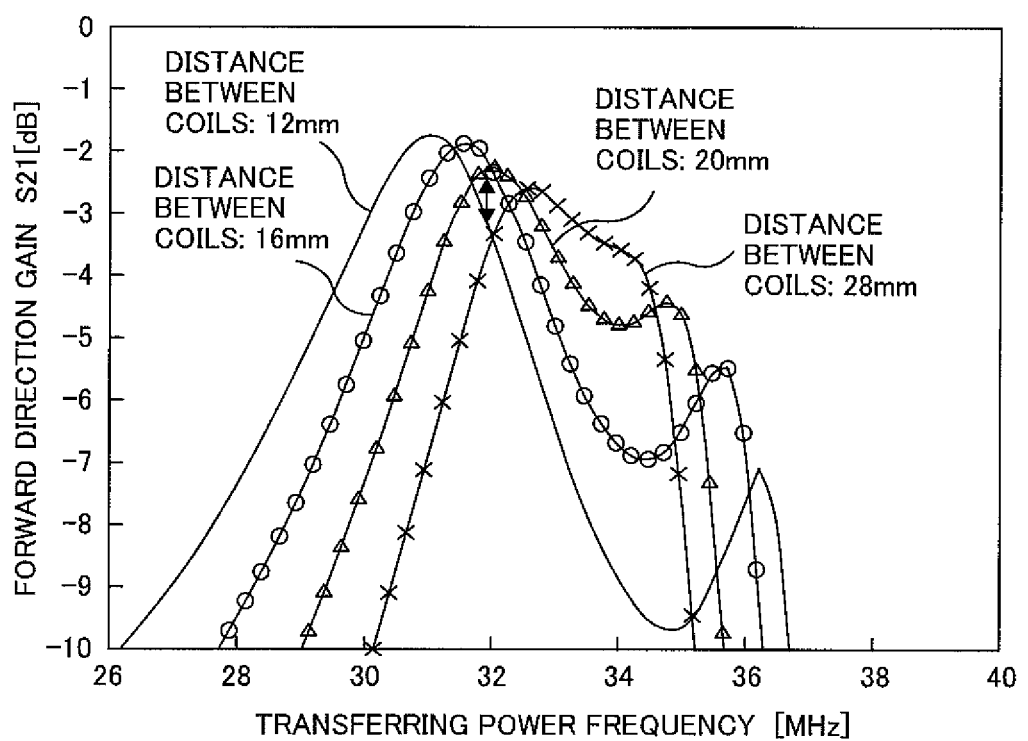
FIG. 5 is a graph of an experimental result for showing transmission loss characteristics of the wireless power transfer means, according to the first embodiment of the preset invention.
Figure 6:
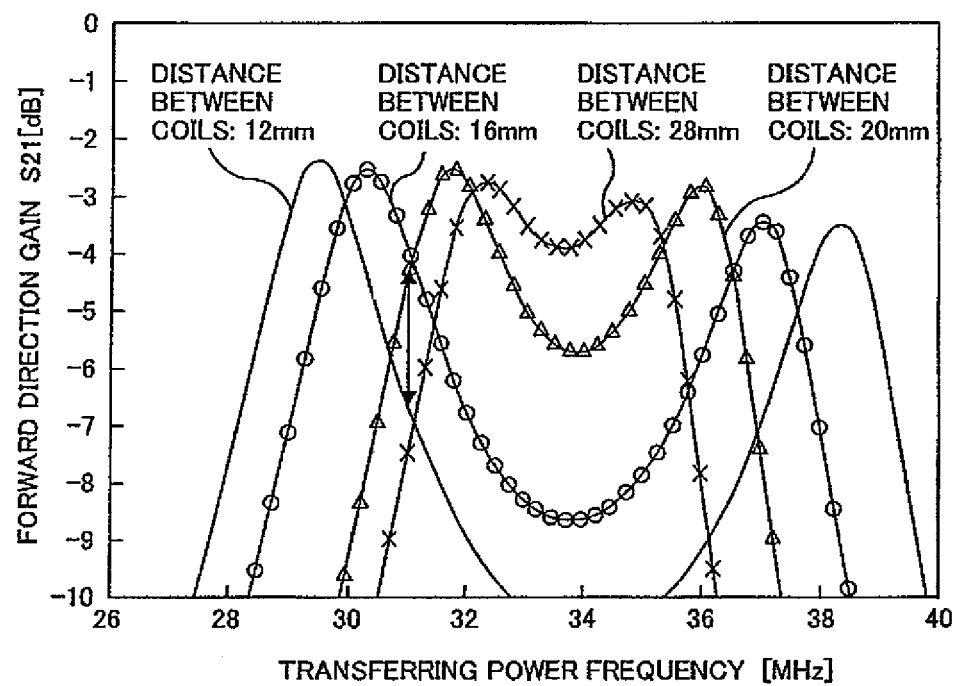
FIG. 6 is an experimental result for showing transmission loss characteristics of the conventional art shown in FIG. 8.
Figure 7:
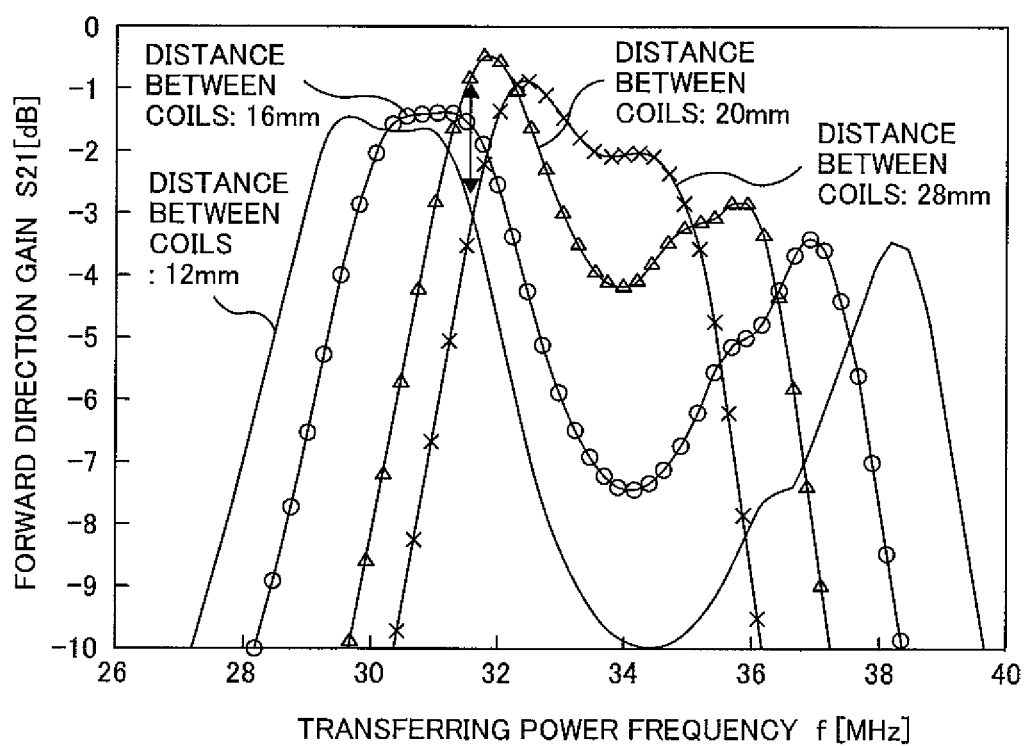
FIG. 7 is a simulation result for showing transmission loss characteristics of the wireless power transfer means, according to the second embodiment of the present invention.

FIG. 5 shows an experimental result of the transmission loss characteristics from the supply-side power supply coil to the load-side power supply coil, in relation to transfer distance between the coils, i.e., the supply-side magnetic resonance coil and the load-side magnetic resonance coil, in the first embodiment of the wireless power transfer means shown in FIG. 1, and FIG. 7 shows simulation values of the transmission loss characteristics from the supply-side power supply coil to the load-side power supply coil, which are estimated upon basis of the result shown in FIG. 5, in the second embodiment of the wireless power transfer means shown in FIG. 2. Also, FIG. 6 shows an experimental result of the transmission loss characteristics from the supply-side power supply coil to the load-side power supply coil, in the conventional coil disposition of the wireless power transfer with applying the magnetic resonance coil therein, which was shown by the conventional art in FIG. 8.

However, the coils used in those experiments, the supply-side magnetic resonance coil and the load-side magnetic resonance coil are coils, each having peripheral length of 20 cm, and a turn number of 15 turns, and the resonance frequency thereof is about 33 MHz, and the supply-side power supply coil and the load-side power supply coil are coils, each having peripheral length of 18 cm, and a turn number of 1 turn. Also, those are values, which are measured at a relatively near distance, such as, 12 mm, 16 mm, 20 mm, and 28 mm, for example, the distance between the coils, i.e., the supply-side magnetic resonance coil and the load-side magnetic resonance coil, while assuming a wireless charging apparatus to the battery, and those are values when swinging the frequency of the electric power to be transferred from 26 MHz to 40 MHz. The horizontal axis of those figures shows the frequency of the electric power to be transferred, and the vertical axis thereof shown a forward direction gain S21, respectively.

In FIG. 5, when the frequency of the transferring electric power is fixed, and when the distance between the coils is changed from 12 mm to 28 mm, then it is assumed that the frequency, at which the transmission loss is small, is in the vicinity of 32 MHz, and the loss at that time is about from −3.2 dB to −2.3 dB.

In FIG. 6, when the distance between the coils is changed from 12 mm to 28 mm, then it is assumed that the frequency, at which the transmission loss is small, is in the vicinity of 31.8 MHz, and the loss at that time is about from −3.0 dB to −0.7 dB.

In FIG. 7, when the distance between the coils is changed from 12 mm to 28 mm, then it is assumed that the frequency, at which the transmission loss is small, is in the vicinity of 31 MHz, and the loss at that time is about from −6.8 dB to −4.0 dB.

From the above, when comparing FIG. 7 showing the transmission loss characteristics of the conventional art therein, and FIG. 5 showing the transmission loss characteristics of the first embodiment of the wireless power transfer means therein, it can be seen that the first embodiment shown in FIG. 5 is lesser in the transmission loss and a fluctuation of the loss is also lesser. This can be considered, because, in the case of the conventional art, two (2) resonance points appear when shortening the distance between the coils, and the fluctuation of the resonance frequency thereof is large due to the distance between the coils; i.e., it can be seen that the first embodiment is superior in the transfer efficiency to the conventional art.

Further, when comparing FIG. 5 showing the transmission loss of the first embodiment therein, and FIG. 6 showing the transmission loss of the second embodiment therein, since the second embodiment is lesser in the transmission loss, and further the trader efficiency is improved by conducting the power composing with using two (2) sets of the load-side power supply coils; therefore it can be said that widening can be obtained of the band of the resonance frequency of the load-side magnetic resonance coil, equivalently.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A wireless power transfer system, comprising:
   a supply-side power supply coil;
   a supply-side magnetic resonance coil;
   a load-side power supply coil; and
   a load-side magnetic resonance coil, wherein said supply-side magnetic resonance coil is excited with electromagnetic induction, by supplying transmission electric powers of frequencies equal to magnetic resonance frequencies of said supply-side magnetic resonance coil and said load-side magnetic resonance coil to said supply-side power supply coil by means of an oscillator, thereby transferring an electric power from said supply-side magnetic resonance coil and said load-side magnetic resonance coil, wirelessly, with applying a magnetic resonance phenomenon between said supply-side magnetic resonance phenomenon between said supply-side magnetic resonance coil and said load-side magnetic resonance coil, so as to output the transmission electric power transferred to said load-side magnetic resonance coil by said load-side power supply coil with the electromagnetic induction, and wherein a distance between said supply-side magnetic resonance coil and said load-side power supply coil is shorter than a distance between said supply-side magnetic resonance coil and said load-side magnetic resonance coil, and is longer than a distance between said load-side power supply coil and said load-side magnetic resonance coil.

2. The wireless power transfer system, as described in the claim 1, wherein a distance between said supply-side power supply coil and said load-side magnetic resonance coil is shorter than the distance between said supply-side magnetic resonance coil and said load-side magnetic resonance coil.

3. The wireless power transfer system, as described in the claim 1, further comprising a first load-side power supply coil and a second load-side power supply coil, wherein said coils are so disposed that a distance between said supply-side magnetic resonance coil and said first load-side power supply coil is shorter than the distance between said supply-side magnetic resonance coil and said load-side magnetic resonance coil, and is a distance between said supply-side magnetic resonance coil and said second load-side power supply coil is longer than that.

4. The wireless power transfer system, as described in the claim 3, further comprising a power synthesizer circuit, which is configured to receive an electric power by composing the transferred electric powers to be outputted to said first load-side power supply coil and said second load-side power supply coil.

5. The wireless power transfer system, as described in the claim 3, further comprising an exchanger circuit, which is configured to detect the transferring voltages outputted to said first load-side power supply coil and said second load-side power supply coil, thereby taking an electric power from the power supply coil having higher voltage.

6. The wireless power transfer system, as described in the claim 3, further comprising a rectifier circuit, which is configured to convert a transferring power having a frequency equal to a magnetic resonance frequency, which is outputted from said load-side power supply coil, into a DC power, and said rectifier circuit is a synchronization rectifier circuit, which is built up with MOS transistors.

7. The wireless power transfer system, as described in the claim 6, wherein said rectifier circuit has such structure that said load-side power supply coil has at least a turn number equal to or greater than 3 turns, and on said coil are provided with a first tap and a second tap, wherein to said first tap is connected a source of a first MOS transistor, a gate of which is connected to a coil end on a side of said first tap and a drain of which is connected to a first DC voltage output terminal through a first inductor, and to said second tap is connected a source of a second MOD transistor, as well as, a second DC voltage output terminal, a gate of which is connected to a coil end on a side of said second tap and a drain of which is connected to a junction point between the drain of said first MOS transistor and said first inductor, and a capacitor is added between said first DC voltage output terminal and said second DC voltage output terminal.

8. The wireless power transfer system, as described in the claim 1, wherein said supply-side power supply coil and said supply-side magnetic resonance coil are provided on a charger, and said load-side power supply coil and said load-side magnetic resonance coil are provided on an equipment mounting a rechargeable battery thereon.

9. A wireless power transfer system, comprising:
a supply-side power supply coil;
a supply-side magnetic resonance coil;
a load-side power supply coil; and
a load-side magnetic resonance coil, wherein
said supply-side magnetic resonance coil is excited with electromagnetic induction, by supplying transmission electric powers of frequencies equal to magnetic resonance frequencies of said supply-side magnetic resonance coil and said load-side magnetic resonance coil to said supply-side power supply coil by means of an oscillator, thereby transferring an electric power from supply-side magnetic resonance coil and said load-side magnetic resonance coil, wirelessly, with applying a magnetic resonance phenomenon between said supply-side magnetic resonance coil and said load-side magnetic resonance coil, so as to output the transmission electric power transferred to said load-side magnetic resonance coil by said load-side power supply coil with the electromagnetic induction, and wherein
a distance between said supply-side power supply coil and said load-side magnetic resonance coil is shorter than a distance between said supply-side magnetic resonance coil and said load-side magnetic resonance coil, and is longer than a distance between said load-side power supply coil and said load-side magnetic resonance coil.

10. A load apparatus in a wireless power transfer system, comprising:
a power supply apparatus having a supply-side power supply coil and a supply-side magnetic resonance coil; and
a load apparatus having a load-side power supply coil and a load-side magnetic resonance coil, wherein
said supply-side magnetic resonance coil is excited with electromagnetic induction, by supplying transmission electric powers of frequencies equal to magnetic resonance frequencies of said supply-side magnetic resonance coil and said load-side magnetic resonance coil to said supply-side power supply coil by means of an oscillator, thereby transferring an electric power from said supply-side magnetic resonance coil and said load-side magnetic resonance coil, wirelessly, with applying a magnetic resonance phenomenon between said supply-side magnetic resonance coil and said load-side magnetic resonance coil, so as to output the transmission electric power transferred to said load-side magnetic resonance coil by said load-side power supply coil with the electromagnetic induction, wherein
a distance between said supply-side magnetic resonance coil and said load-side power supply coil is shorter than a distance between said supply-side magnetic resonance coil and said load-side magnetic resonance coil, and is longer than a distance between said load-side power supply coil and said load-side magnetic resonance coil.

11. A load apparatus in a wireless power transfer system, comprising:
a power supply apparatus having a supply-side power supply coil and a supply-side magnetic resonance coil; and
a load apparatus having a load-side power supply coil and a load-side magnetic resonance coil, wherein said supply-side magnetic resonance coil is excited with electromagnetic induction, by supplying transmission electric powers of frequencies equal to magnetic resonance frequencies of said supply-side magnetic resonance coil and said load-side magnetic resonance coil to said supply-side power supply coil by means of an oscillator, thereby transferring an electric power from said supply-side magnetic resonance coil and said-load side magnetic resonance coil, wirelessly, with applying a magnetic resonance phenomenon between said supply-side magnetic resonance coil and said load-side magnetic resonance coil, so as to output the transmission electric power transferred to said load-side magnetic resonance coil by said load-side power supply coil with the electromagnetic induction, wherein a distance between said supply-side power supply coil and said load-side magnetic resonance coil is shorter than a distance between said supply-side magnetic resonance coil and said load-side magnetic resonance coil, and is longer than a distance between said load-side power supply coil and said load-side magnetic resonance coil.

\* \* \* \* \*